United States Patent
Nakagawa

(10) Patent No.: US 12,384,391 B2
(45) Date of Patent: Aug. 12, 2025

(54) VEHICLE BATTERY CONTROL BASED ON REMAINING CHARGE

(71) Applicant: Toyota Motor Engineering & Manufacturing North America, Inc., Plano, TX (US)

(72) Inventor: Masashi Nakagawa, Sunnyvale, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 90 days.

(21) Appl. No.: 17/234,516

(22) Filed: Apr. 19, 2021

(65) Prior Publication Data

US 2022/0332332 A1 Oct. 20, 2022

(51) Int. Cl.
| | |
|---|---|
| *B60W 50/035* | (2012.01) |
| *B60K 6/28* | (2007.10) |
| *B60L 58/12* | (2019.01) |
| *G01C 21/34* | (2006.01) |
| *G07C 5/08* | (2006.01) |

(52) U.S. Cl.
CPC .......... *B60W 50/035* (2013.01); *B60L 58/12* (2019.02); *G01C 21/3476* (2013.01); *G07C 5/0816* (2013.01); *B60K 6/28* (2013.01); *B60L 2240/54* (2013.01); *B60L 2240/622* (2013.01); *B60W 2510/244* (2013.01); *B60W 2556/50* (2020.02); *B60Y 2200/92* (2013.01); *B60Y 2300/91* (2013.01)

(58) Field of Classification Search
CPC ......... B60W 50/035; B60W 2510/244; B60W 2556/50; B60W 2300/91; B60W 2256/50; B60L 58/12; B60L 2240/54; B60L 2240/622; G01C 21/3476; G07C 5/0816; B60K 6/28; B60Y 2200/92; B60Y 2300/91
See application file for complete search history.

(56) References Cited

U.S. PATENT DOCUMENTS 9,126,544 B2 * 9/2015 Larson .................... B60R 16/03
9,377,839 B2 * 6/2016 Sasidharan ........... G06F 9/4893
(Continued)

FOREIGN PATENT DOCUMENTS

JP 2011075290 A * 4/2011

OTHER PUBLICATIONS

"Ruf, F et al.; Autonomous Load Shutdown Mechanism as a Voltage Stabilization Method in Automotive Power Nets; 2012; 2012 IEEE Vehicle Power and Propulsion Conference" (Year: 2012).*

Primary Examiner — Ramya P Burgess
Assistant Examiner — Christopher R Cardimino
(74) Attorney, Agent, or Firm — Snell & Wilmer LLP

(57) ABSTRACT

Vehicles and methods for controlling a battery of the vehicle based on remaining battery charge. A vehicle may include a battery configured to supply electricity to native and external electrical components of the vehicle. The vehicle may include an electronic control unit (ECU) coupled to the battery. The ECU may be configured to receive a priority rank for each of the electrical components. The ECU may be further configured to stop the battery from supplying the electricity to one or more of the electrical components that are below a predetermined priority rank when a charge of the battery is low.

17 Claims, 4 Drawing Sheets

(56) References Cited

U.S. PATENT DOCUMENTS

| | | | | |
|---|---|---|---|---|
| 9,781,542 | B2* | 10/2017 | Rangarajan | H04W 52/0258 |
| 9,936,458 | B2* | 4/2018 | Chen | H04W 52/0261 |
| 10,418,843 | B2* | 9/2019 | Causey | H02J 50/10 |
| 10,464,547 | B2* | 11/2019 | Park | B60W 20/40 |
| 10,696,165 | B2* | 6/2020 | Bennett | B60L 15/2045 |
| 10,852,737 | B2* | 12/2020 | Szubbocsev | B60L 58/16 |
| 11,703,340 | B2* | 7/2023 | Baglino | G01C 21/3697 |
| | | | | 701/533 |
| 2004/0189098 | A1* | 9/2004 | Algrain | F01M 5/02 |
| | | | | 307/80 |
| 2014/0214267 | A1* | 7/2014 | Sellschopp | G06F 17/00 |
| | | | | 701/34.2 |
| 2019/0263290 | A1* | 8/2019 | Monahan | B60L 58/14 |
| 2021/0138983 | A1* | 5/2021 | Sato | H01M 10/48 |
| 2021/0213896 | A1* | 7/2021 | Cox | B60R 16/03 |
| 2022/0228877 | A1* | 7/2022 | Feldman | G01C 21/3476 |

* cited by examiner

VEHICLE BATTERY CONTROL BASED ON REMAINING CHARGE

BACKGROUND

1. Field

The present disclosure is directed to controlling a battery of a vehicle, specifically to controlling the power supplied by the battery to electrical components of the vehicle.

2. Description of the Related Art

Fuel-efficient vehicles (e.g., hybrid, plug-in hybrid, electric, fuel cell) continue to gain popularity over the years. Batteries of fuel-efficient vehicles that supply power to their motors (e.g., electric motor, internal combustion engine) to propel the vehicles may also supply power to electrical components of the vehicle (e.g., air conditioner, seat heater, infotainment unit, telephone, refrigerator, ventilator, music player, speakers, outdoor light, electric stove, movie projector, smartphone, etc.). The electrical components may draw considerable power from the battery, even when the battery charge is depleted. A driver or a user of the vehicle may often not be aware that certain electrical components are drawing power from the vehicle battery, even when the battery charge is low or critical. Additionally, the driver may not be able to turn off certain electrical components while driving (e.g., a refrigerator in the trunk, a television by the rear seats).

As such, there is a need for vehicles and methods for controlling power supplied by the battery to electrical components of the vehicle based on remaining battery charge.

SUMMARY

Vehicles and methods for controlling a battery of the vehicle based on remaining battery charge. A vehicle may include a battery that powers electrical components of the vehicle. The vehicle may include an electronic control unit (ECU) connected to the battery. The ECU may receive a priority rank for each of the electrical components from the user. The ECU may stop the battery from powering one or more electrical components that are below a predetermined priority rank when the battery charge is low (e.g., below 30 percent).

In accordance with an embodiment of the present disclosure, there may be a vehicle. The vehicle may include a battery. The battery may be configured to supply electricity to native and external electrical components of the vehicle. The vehicle may include an ECU coupled to the battery. The ECU may be configured to receive a priority rank for each of the electrical components. The ECU may be further configured to stop the battery from supplying the electricity to one or more of the electrical components that are below a predetermined priority rank when a charge of the battery is low. The charge of the battery may be low when the charge is below a predetermined percentage. The ECU may be further configured to notify a user of the vehicle when the charge of the battery is low. The electrical components may be grouped in priority groups. Each priority group of the priority groups may have a priority rank.

The ECU may be further configured to stop the battery from supplying the electricity to one or more of the electrical components that are below a second predetermined priority rank where the predetermined priority rank is a first predetermined priority rank. The second predetermined priority rank may be higher than the first priority rank when a charge of the battery is critical.

The vehicle may further include a motor. The motor may be configured to convert electricity into mechanical energy to propel the vehicle. The battery may be used to power the motor. The charge of the battery may be critical when the charge is insufficient for the motor to propel the vehicle to a charging station closest to the vehicle.

The vehicle may further include a global positioning system (GPS) sensor. The GPS sensor may be configured to detect location data corresponding to a location of the vehicle in real-time. The GPS sensor may be coupled to the ECU. The ECU may be further configured to determine the charging station closest to the vehicle.

In accordance with an embodiment of the present disclosure, there may be a vehicle. The vehicle may include a battery. The battery may be configured to supply electricity or provide power to the motor as well as native and external electrical components of the vehicle. The vehicle may further include an ECU coupled to the battery. The ECU may be configured to notify a user of the vehicle when a charge of the battery is low (e.g., below 30 percent) or critical (below 15 percent). The ECU may be further configured to receive a selection input from the user regarding one or more of the electrical components to be turned off. The ECU may be further configured to automatically stop the battery from supplying the electricity to the one or more of the electrical components when one or more conditions are met (e.g., the battery is low or critical). The ECU may be further configured to receive grouping instructions from the user to group the electrical components into groups to turn off all members of a group simultaneously based on user input or the one or more conditions being met.

The charge of the battery may be low when the charge is below a predetermined percentage. The vehicle may further include a motor. The battery may be used to power the motor. The motor may be configured to convert electricity into mechanical energy to propel the vehicle. The charge of the battery may be critical when the charge is insufficient for the motor to propel the vehicle to a charging station closest to the vehicle.

The vehicle may further include a global positioning system (GPS) sensor. The GPS sensor may be configured to detect location data corresponding to a location of the vehicle in real-time. The GPS sensor may be coupled to the ECU. The ECU may be further configured to determine the charging station closest to the vehicle.

In accordance with an embodiment of the present disclosure, there may be a method. The method may include receiving, by an ECU, a priority rank for each native and external electrical component coupled to a vehicle and supplied electricity by a battery of the vehicle. The method may further include stopping, by the ECU, the battery from supplying the electricity to one or more of the electrical components that are below a predetermined priority rank when a charge of the battery is low. The charge of the battery may be low when the charge is below a predetermined percentage. The method may further include notifying, by an output device, a user of the vehicle when the charge of the battery is low.

The method may further include grouping, by an input device, the electrical components in priority groups. Each priority group of the priority groups may have a priority rank.

The method may further include stopping, by the ECU, the battery from supplying the electricity to one or more of the electrical components that are below a second predetermined priority rank where the predetermined priority rank is a first predetermined priority rank. The second predetermined priority rank may be higher than the first priority rank when a charge of the battery is critical.

The method may further include stopping, by the ECU, the battery from supplying the electricity to the electrical components when a charge of the battery is critical. The charge of the battery may be critical when the charge is insufficient for a motor of the vehicle to propel the vehicle to a charging station closest to the vehicle. The method may further include detecting, by a GPS sensor, location data corresponding to a location of the vehicle in real-time. The method may further include determining, by the ECU, the charging station closest to the vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The vehicles and methods described herein control a battery of the vehicle based on a remaining battery charge. The battery may power electrical components of the vehicle (e.g., air conditioner, seat heater, infotainment unit, telephone, refrigerator, ventilator, music player, speakers, outdoor light, electric stove, movie projector, smartphone, etc.). The vehicle may include an ECU connected to the battery. The ECU may receive a priority rank for each of the electrical components from a driver or a user of the vehicle. The term "driver" or "user" may be interchanged with "passenger" when referring to autonomous or semi-autonomous vehicles. In some embodiments, the electrical components may be grouped into priority groups where each priority group has a priority rank. The ECU may advantageously automatically stop the battery from powering one or more electrical components that are below a predetermined priority rank when the battery charge is low. The battery charge may be low when the charge is below a predetermined percentage. The ECU may advantageously automatically stop the battery from powering one or more electrical components that are below a second predetermined priority rank higher than a first priority rank when the batter charge is critical. The battery charge may be critical when the charge is insufficient for a motor of the vehicle to propel the vehicle to a charging station closest to the vehicle. The ECU may notify the user when the battery charge is low or critical. In some embodiments, the user may advantageously select one or more electrical components to be turned off upon receiving the notification. The ECU may then stop the battery from supplying electricity to the one or more electrical components.

Figure 1:
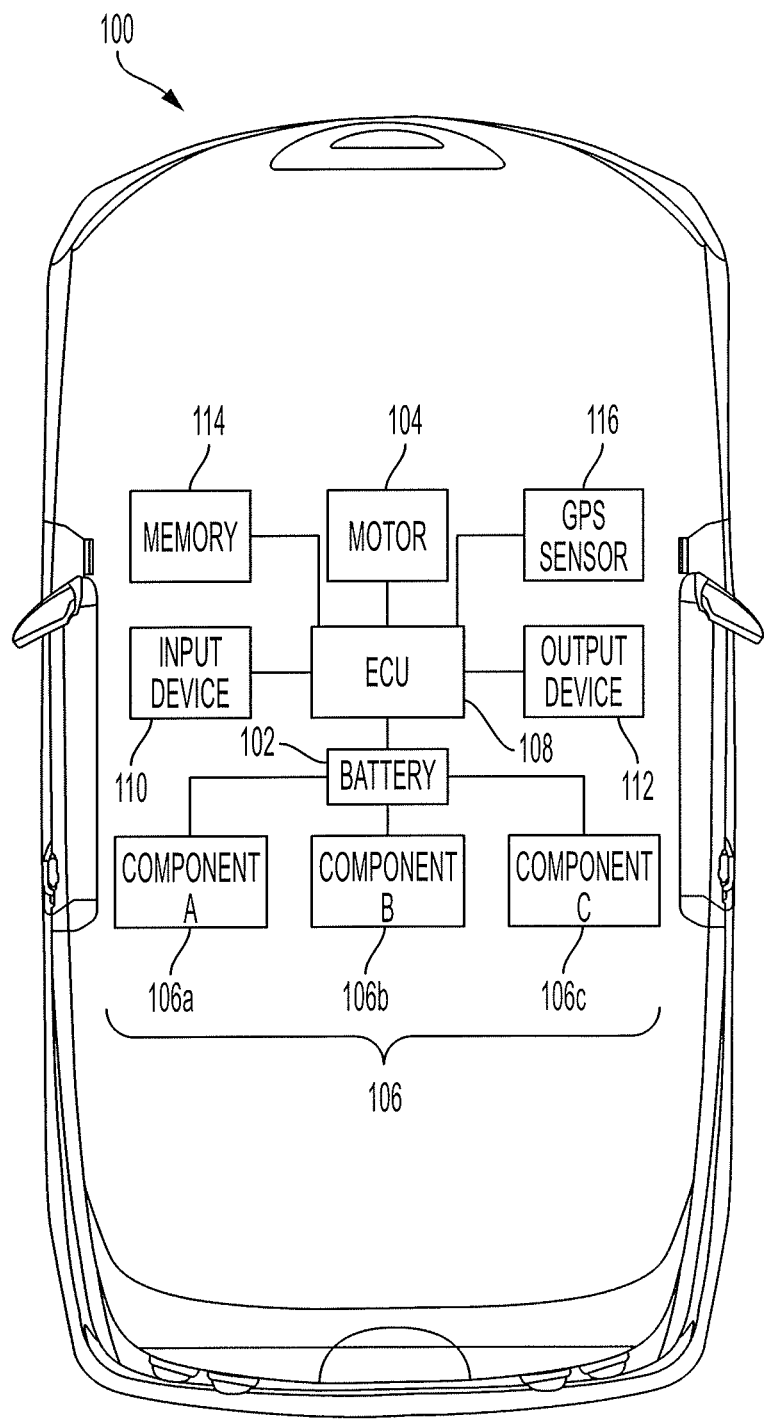
FIG. 1 illustrates a block diagram of a vehicle that can control a battery of the vehicle based on a remaining battery charge according to an aspect of the present disclosure.

FIG. 1 illustrates a block diagram of a vehicle 100 that can control a battery of the vehicle based on a remaining battery charge according to an aspect of the present disclosure. The vehicle 100 may be a vessel that is configured to transport one or more persons, such as an automobile or a motorcycle. The vehicle 100 may be a sedan, a hatchback, a truck, a station wagon, a sport utility vehicle (SUV), a utility terrain vehicle (UTV), a crossover, a van, a motorhome or the like. The vehicle 100 may be an electric vehicle powered by a battery (or multiple batteries) 102. The vehicle 100 may be a partial electric vehicle, such as a hybrid vehicle or a plug-in hybrid vehicle, which may have an internal combustion engine in addition to an electric motor 104. The vehicle 100 may be a fully electric vehicle which may solely rely on the electric motor 104 to propel the vehicle 100 forward. The vehicle 100 may be a hydrogen fuel-cell vehicle that has a fuel cell in addition to the battery 102 for the electric motor 104 to draw electricity from. The battery 102 may be one or more batteries connected to each other and to the electric motor 104 to power the electric motor 104. The battery 102 may also provide power to other electrical components 106 of the vehicle 100. The electrical components 106 may be integrated into the vehicle 100 (i.e., native) or auxiliary (i.e., external) to the vehicle 100. For example, the electrical components 106 may be an air conditioner, a seat heater, an infotainment unit, a telephone, a refrigerator, a ventilator, an electronic device being charged, lights, a sound system, a winch, a television display, a gaming console, and/or the like. Electrical components 106a-c are shown in FIG. 1 by example. In other examples, there may be less or more electrical components 106. The battery 102 may be any kind of battery, for example, a lithium-ion battery. The battery 102 may require charging at a charging station as needed based on battery charge consumption similar to fueling a vehicle at a gas station. The charging station may be a designated charging station that resembles a gas station or may be located at one's home garage, a public or private parking garage, a parking lot, and the like.

The battery 102 and the motor 104 may be coupled to one or more ECUs 108. The one or more ECUs 108 may be programmed to control one or more operations of the vehicle 100. The one or more ECUs 108 may be implemented as a single ECU 108 or in multiple ECUs 108. The ECU 108 may be electrically coupled to some or all of the components of the vehicle 100. For example, the ECU 108 may be coupled to an input device 110, an output device 112, a memory 114, and a GPS sensor 116 as shown in FIG. 1. In some embodiments, some or all of the electrical components 106 may be directly coupled to and controlled by the ECU 108. In some embodiments, the ECU 108 may be a central ECU configured to control one or more operations of the entire vehicle 100. In some embodiments, the ECU 108 may be multiple ECUs located within the vehicle 100 and each configured to control one or more local operations of the vehicle 100.

In some embodiments, the ECU 108 may be one or more computer processors or controllers configured to execute instructions stored in a non-transitory memory 114. The memory 114 may store machine-readable instructions usable by the ECU 108 and may store other data as requested by the ECU 108. The memory 114 may be a random-access memory (RAM), a disk, a flash memory, optical disk drives, hybrid memory, or any other storage medium that can store data. The memory 114 may store data in an encrypted or any other suitable secure form.

The input device 110 may receive user input. The input device 110 may receive visual, auditory, and/or touch input. For example, the input device 110 may be a camera, a microphone, a touchscreen, or a button. The input device 110 may be integrated with a display 118 (see FIGS. 2-4) of the vehicle 100. The input device 110 may receive biometric information, the user's voice, and/or the user's touch input with one or more fingers.

The output device 112 may present information visually or auditorily. The output device 112 may be a display (e.g., a touchscreen), a speaker, or the like. For example, the output device may be the display 118 (see FIGS. 2-4). The display may be a liquid crystal display (LCD), a light-emitting diode display (LED), an organic light emitting diode (OLED), a plasma display, a cathode-ray tube (CRT) display, a digital light processing display (DLPT), a micro-display, a projection display, or any other display appreciated by one of ordinary skill in the art. The display may display user interfaces, text, images, and/or the like. In some embodiments, the output device 112 may be a sound system. For example, the presentation may be in the form of a voice assistant presenting setting options or reciting information through one or more speakers of the sound system.

The GPS sensor 116 may gather data pertaining to a location of the vehicle 100 in real-time. The GPS sensor 116 may detect the position of the vehicle 100. The processor of the ECU 108 may determine relative positions of points of interests, such as charging stations, to the vehicle 100. The processors may determine a plurality of routes to a charging station, such as the fastest route, shortest route, no toll fee route, accident-free route, etc.

The charge of the battery 102 may be indicated as a percentage. When the vehicle 100 is newly charged, the charge may be at hundred percent (100%). As the vehicle 100 is driven and electrical components 106 are turned on and used, the charge may decrease until the charge is zero percent (0%). When the charge is 0%, the motor 104 may no longer receive the requisite power to propel the vehicle 100. Thus, the vehicle 100 cannot be driven further. In order to prevent a scenario where the vehicle 100 is stranded on the road due to the battery 102 having 0% charge, the ECU 108 may turn off certain electrical components 106 until the user recharges the vehicle 100. In order to determine which electrical components 106 to turn off, the ECU 108 may receive a priority rank for each of the electrical components 106. For example, having the air conditioner run may be more important to the user than charging the user's mobile device. In another example, charging the user's mobile device may be more important to the user than having the television displays facing the rear seats on. In such a situation, the user may rank the electrical components 106 such that the highest priority is the air conditioner, then the mobile device charging, then the television displays. The user may input the priority rank via the input device 110 prior to driving or while driving as safety rules permit. The user may change the priority rank via the input device 110 at a later time. The memory 114 may store the priority rank for the ECU 108 to access. The ECU 108 may turn off the electrical components 106 based on the priority rank as the charge decreases. For example, when the charge is at sixty percent (60%), the ECU 108 may turn off the television displays as the television displays are lowest priority. Then, when the charge is at fifty percent (50%), the ECU 108 may cut power to the mobile device charger. Last, when the charge is at forty percent (40%), the ECU 108 may turn off the air conditioner. The percentages that trigger the ECU 108 to turn off electrical components 106 may be determined by the user. The user may choose at what percentage to turn off the electrical component 106 at each priority rank. For example, the user may wish to turn off the lowest priority electrical component 106 when the charge is at seventy percent (70%), 50%, or 40%. In another example, the user may wish to turn off the highest priority electrical component 106 when the charge is at thirty percent (30%), twenty percent (20%), or ten percent (10%). The user may input the percentage settings via the input device 110 prior to driving or while driving. The user may change the percentage settings via the input device 110 at a later time.

In some embodiments, in order to determine which electrical components 106 to turn off, the ECU 108 may receive input to group the electrical components 106 into priority groups, each priority group having a priority rank. For example, having the air conditioner run may be equally important to the user as charging the user's mobile device. In another example, having the air conditioner run and charging the user's mobile device may be more important to the user than having the television displays facing the rear seats on. In such a situation, the user may group and rank the electrical components 106 such that the highest priority are the air conditioner and the mobile device charging, then the television displays. The user may input the priority groups and the priority rank via the input device 110 prior to driving or while driving. The user may change the priority group and the priority rank via the input device 110 at a later time. The memory 114 may store the priority group and the priority rank for the ECU 108 to access. The ECU 108 may turn off the electrical components 106 based on the priority group and the priority rank of each priority group as the charge decreases. For example, when the charge is at sixty percent (60%), the ECU 108 may turn off the television displays as the television displays are the lowest priority. Then, when the charge is at forty percent (40%), the ECU 108 may turn off the air conditioner and the mobile device charger. The percentages that trigger the ECU 108 to turn off electrical components 106 may be determined by the user. The user may choose at what percentage to turn off the electrical component 106 of each priority group at each priority rank. For example, the user may wish to turn off the lowest priority group when the charge is at seventy percent (70%), 50%, or 40%. In another example, the user may wish to turn off the highest priority group when the charge is at thirty percent (30%), twenty percent (20%), or ten percent (10%). The user may input the percentage settings via the input device 110 prior to driving or while driving. The user may change the percentage settings via the input device 110 at a later time.

The ECU 108 may receive location data of the vehicle 100 from the GPS sensor 116, and the processor of the ECU 108 may determine a location of the closest accessible charging station to the vehicle 100. The processor may determine the location of the closest accessible charging station to the vehicle 100 by searching charging station location databases stored in the memory 114 or the Internet using the location data obtained from the GPS sensor 116. In some embodiments, the proximity of the charging station to the vehicle 100 may be measured based on using built roads. In some embodiments, the built roads may include or exclude tollroads. In some embodiments, the proximity may be based on off-road driving. The proximity measuring criteria may be based on user input. The processor of the ECU 108 may determine the battery charge required to drive the vehicle 100 to the charging station. The processor may include a safety margin in the calculation of the battery charge required to drive the vehicle 100 to the charging station. For example, the processor may add a five percent (5%) to fifteen percent (15%) charge to the battery charge required as a safety margin. The safety margin may be based on user input. The user may elect to be risk averse, thereby choosing to have a higher safety margin. Alternately, the user may accept higher risk, thereby choosing to have a lower safety margin or no safety margin at all.

When the processor determines that the battery charge is insufficient for the motor 104 to propel the vehicle 100 to the closest charging station, the battery charge may be at a critical level. The ECU 108 may alert the user that the battery charge is at a critical level via the output device 112. The ECU 108 may turn off some or all electrical components 106 when the battery charge is critical. When the battery charge is critical, the highest priority electrical components 106 may be turned off. Alternatively, the user may desire to have the highest priority electrical components 106 to stay turned on even when the battery charge is critical. The user may input a preference to have the highest priority electrical components 106 to stay turned on even when the battery charge is critical prior to starting a trip. The processor of the ECU 108 may then determine the critical battery charge based on the charge required to drive to the closest charging station while also powering the highest priority electrical components 106.

Figure 2:
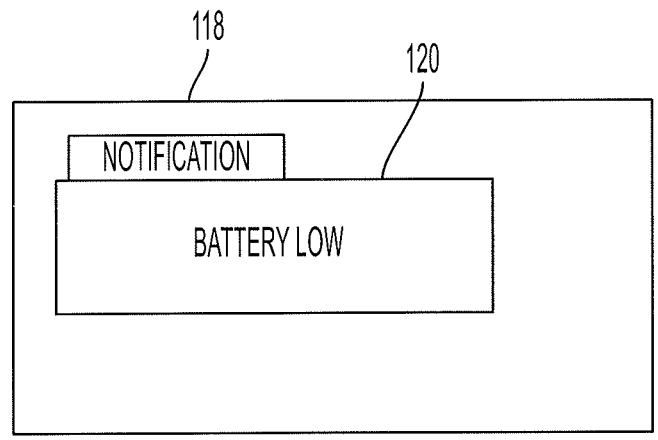
FIG. 2 illustrates a display of the vehicle displaying a notification that the charge of the battery is low according to an aspect of the present disclosure.

FIG. 2 illustrates a display 118 of the vehicle 100 (see FIG. 1) displaying a notification 120 that the charge of the battery is low according to an aspect of the present disclosure. The charge may be low when the battery is below a predetermined percentage. The percentage may be predetermined by the user or factory settings. For example, the charge may be low when it is at or below 50%. In another example, the charge may be low when it is below twenty five percent (25%). In another example, the charge may be low when it is a certain percentage away from being critical. For example, if the charge is 15% or less away from being critical, the charge may be low. The display 118 may also display a notification 120 that the charge of the battery is critical. The charge of the battery may be critical when the processor of the ECU 108 (see FIG. 1) determines that the battery charge is insufficient for the motor 104 (see FIG. 1) to propel the vehicle 100 to the closest charging station. In some embodiments, the notification 120 may be auditory or haptic. In such embodiments, the output device 112 may include a sound system, a vibrating steering wheel, a vibrating gear shifter, and/or the like. After receiving the notification 120, the user may assign a priority rank to each electrical component 106 (see FIG. 1).

Figure 3:
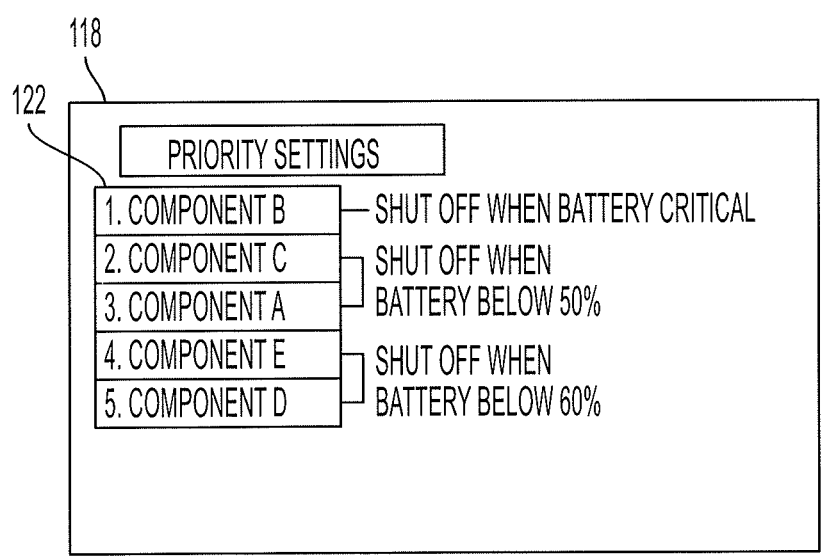
FIG. 3 illustrates a display of the vehicle displaying a priority settings screen according to an aspect of the present disclosure.

FIG. 3 illustrates a display 118 of the vehicle 100 (see FIG. 1) displaying a priority settings screen according to an aspect of the present disclosure. The priority settings screen may display a list 122 of electrical components 106 (see FIG. 1). The electrical components 106 may be detected when they are coupled to the battery 102 (see FIG. 1). For example, the listed electrical components 106 may include electrical components A-E. The user may rank electrical components A-E in order of priority. For example, the rank may be from 1 to 5. The user may drag and drop or select and move the electrical components A-E to place them in order via the input device 110 (see FIG. 1). By example and as shown in FIG. 3, the order of the list 122 may be as follows from highest priority to lowest priority: electrical component B, electrical component C, electrical component A, electrical component E, and electrical component D.

Before or after ranking each electrical component 106, the user may assign a command to each rank. For example, the user may choose the first rank to shut off when the battery charge is critical, the second and third ranks to shut off when the battery charge is at or below 50%, and the fourth and fifth ranks to shut off when the battery charge is at or below 60%. The user may change the battery charge percentages that trigger shutting of the electrical components 106. The user may change the rank before or during a trip.

Figure 4:
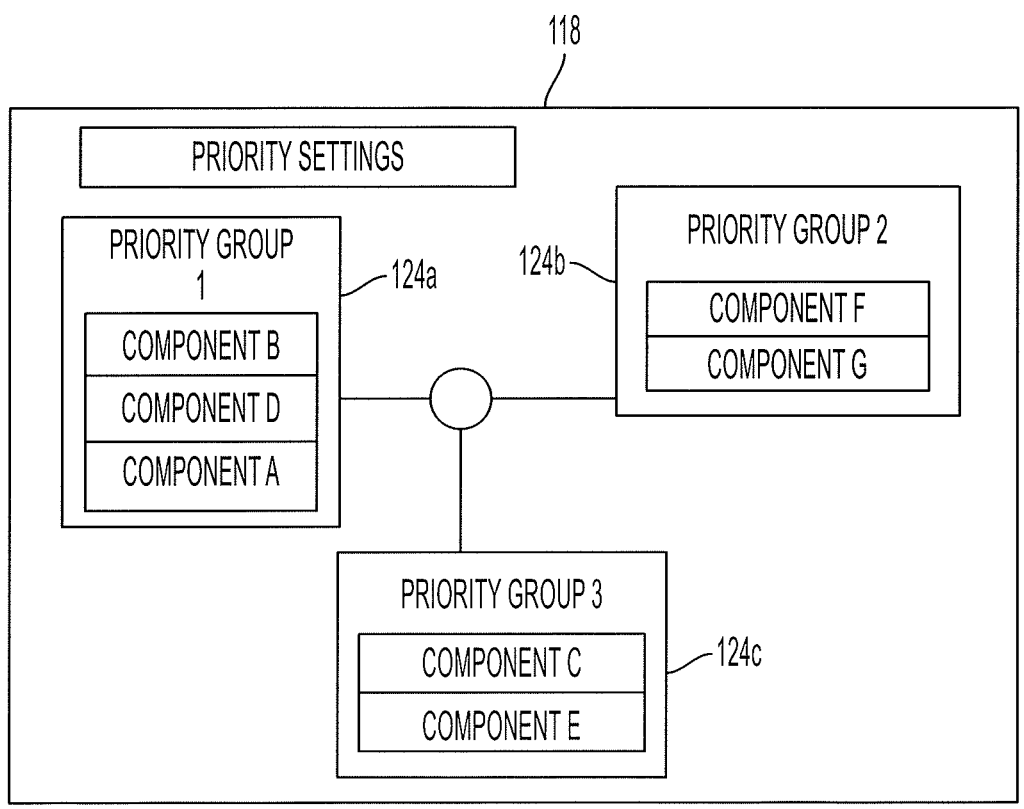
FIG. 4 illustrates a display of the vehicle displaying a priority settings screen according to an aspect of the present disclosure.

FIG. 4 illustrates a display 118 of the vehicle 100 (FIG. 1) displaying a priority settings screen according to an aspect of the present disclosure. The priority settings screen may display priority groups 124*a-c* including electrical components 106 (see FIG. 1). The electrical components 106 may be detected when they are coupled to the battery 102 (see FIG. 1). For example, the grouped electrical components 106 may include electrical components A-G. The user may group electrical components A-G in order of priority. For example, the groups 124*a-c* may be ranked from 1 to 3. The user may drag and drop or select and move the electrical components A-G to place them in the groups 124*a-c* via the input device 110 (see FIG. 1). By example and as shown in FIG. 4, the order may be as follows from highest priority to lowest priority: electrical components B, D, and A in priority group 1 124*a*, electrical components F and G in priority group 2 124*b*, and electrical components E and C in priority group 3 124*c*.

Before or after grouping each electrical component 106, the user may assign a command to each group. For example, the user may choose priority group 1 124*a* to shut off when the battery charge is critical, priority group 2 124*b* to shut off when the battery charge is at or below 50%, and priority group 3 124*c* to shut off when the battery charge is at or below 60%. The user may change the battery charge percentages that trigger shutting off the groups 124*a-c*. The user may change the grouping before or during a trip.

Figure 5:
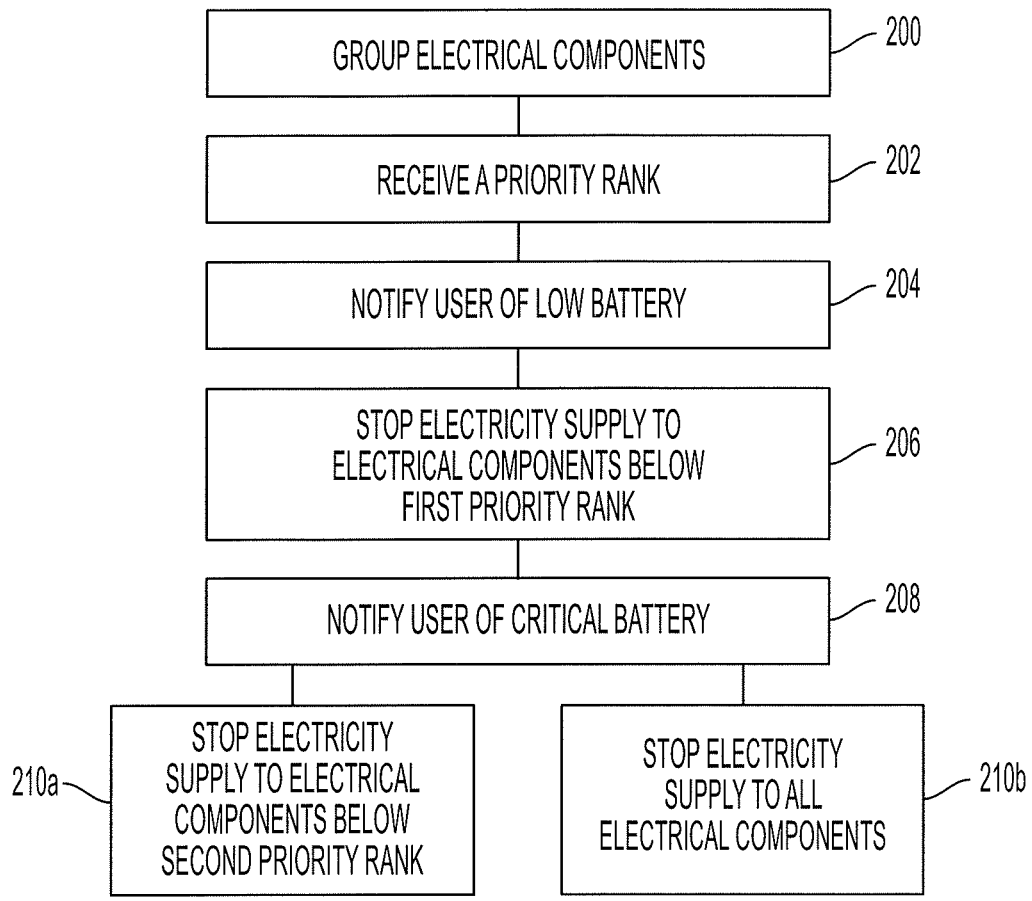
FIG. 5 illustrates a flow chart of a method for controlling a battery of the vehicle based on a remaining battery charge according to an aspect of the present disclosure.

FIG. 5 illustrates a flow chart of a method for controlling a battery 102 (see FIG. 1) of the vehicle 100 (see FIG. 1) based on a remaining battery charge according to an aspect of the present disclosure. The method may commence with block 200. In block 200, electrical components 106 (see FIG. 1) may be grouped in priority groups via an input device 110 (see FIG. 1) as explained in discussing FIG. 4. The priority groups may be transmitted to the ECU 108 (see FIG. 1) to the control electrical components 106 and stored in the memory 114 (see FIG. 1) to be accessed by the ECU 108.

In block 202, the ECU 108 may receive a priority rank for each electrical component 106 coupled to the vehicle 100 and supplied electricity by the battery 102 of the vehicle 100. The priority rank may be a rank for each priority group or each individual electrical component 106. In some embodiments, only block 202 may be performed in lieu of block 200. The priority rank may be inputted via the input device 110.

In block 204, the ECU 108 may notify the user via the output device 112 (see FIG. 1) when the battery charge is low as explained in discussing FIG. 2. The notification may communicate to the user that the power to electrical components 106 below a predetermined priority rank is no longer being supplied by the battery 102. The notification may prompt the user to change the predetermined priority rank or the predetermined percentage of battery charge remaining that defines a low battery charge. The notification may prompt the user to group the electrical components 106 instead of list them for priority ranking or vice versa.

In block 206, the ECU 108 may control the battery 102 to stop the supply of electricity or power to electrical components 106 below a first predetermined priority rank. For example, the ECU 108 may stop power supply to electrical components 106 below a third priority rank in a vehicle 100 with four electrical components 106. In another example, the ECU 108 may stop power supply to electrical components 106 below a second priority rank in a vehicle 100 with four electrical components 106. In another example, the ECU 108 may stop power supply to electrical components 106 of a priority group below a third priority rank in a vehicle 100 with four priority groups.

In block 208, the ECU 108 may notify the user via the output device 112 when the battery charge is critical as explained in discussing FIG. 2. The notification may communicate to the user that the power to electrical components 106 below a predetermined priority rank, or in some embodiments all electrical components 106, is no longer being supplied by the battery 102. The notification may prompt the user to change the predetermined priority rank or the predetermined percentage of battery charge remaining that defines a critical battery charge. The notification may prompt the user to group the electrical components 106 instead of list them for priority ranking or vice versa.

In block 210a, the ECU 108 may stop electricity or power supply to electrical components 106 below a second predetermined priority rank. The second predetermined priority rank may be higher than the first predetermined priority rank. For example, the ECU 108 may stop power supply to electrical components 106 below a second priority rank in a vehicle 100 with four electrical components 106. In another example, the ECU 108 may stop power supply to electrical components 106 below a first priority rank in a vehicle 100 with four electrical components 106. In another example, the ECU 108 may stop power supply to electrical components 106 of a priority group below a first priority rank in a vehicle 100 with four priority groups.

In some embodiments, in lieu of block 210a, the method may continue with block 210b. In block 210b, the ECU 108 may stop electricity or power supply to all electrical components 106 drawing power from the battery 102 regardless of the priority rank or priority group assigned to the electrical components 106. The user may choose to stop power supply to all electrical components 106 when the battery charge is at a critical level or, in other words, only enough to allow the motor 104 to propel the vehicle 100 to the closest charging station.

Figure 6:
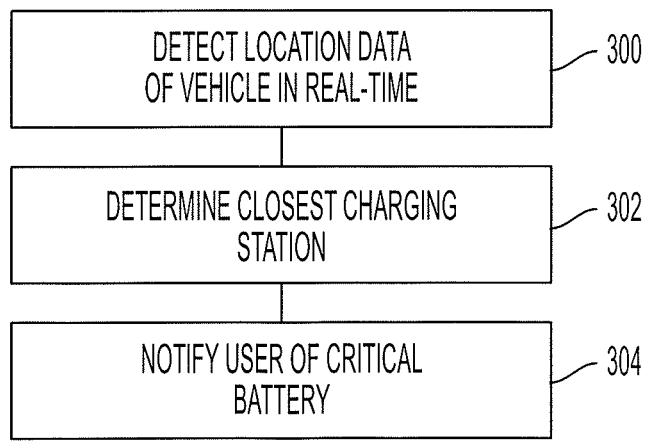
FIG. 6 illustrates a flow chart of a method for notifying a user of a critical battery charge according to an aspect of the present disclosure.

FIG. 6 illustrates a flow chart of a method for notifying a user of critical battery charge according to an aspect of the present disclosure. The method may commence with block 300. In block 300, the GPS sensor 116 (see FIG. 1) may gather data pertaining to a location of the vehicle 100 (see FIG. 1) in real-time. The GPS sensor 116 may detect the position of the vehicle 100 (e.g., latitude, longitude).

In block 302, the processor of the ECU 108 (see FIG. 1) may determine relative positions of charging stations to the vehicle 100 through location data obtained from the GPS sensor 116. The processor may determine the location of the closest accessible charging station to the vehicle 100 by searching charging station location databases stored in the memory 114 (see FIG. 1) or the Internet using the location data obtained from the GPS sensor 116. The processor may determine a plurality of routes to a charging station, such as the fastest route, shortest route, no toll fee route, accident-free route, etc. The processor may determine an estimated time to arrive at a charging station. The processor may determine a closest charging station to the vehicle 100 based on distance using all roads, distance only using certain roads (e.g., no toll-roads), distance off-road, or estimated time to arrive at the charging station.

In block 304, the ECU 108 may notify the user via the output device 112 when the battery charge is critical as explained in discussing FIG. 2. The critical battery charge notification may communicate to the user that the battery 102 (see FIG. 1) has only enough charge remaining for the motor 104 (see FIG. 1) to propel the vehicle 100 to the closest charging station determined in block 302. The notification may communicate to the user that the power to electrical components 106 (see FIG. 1) below a predetermined priority rank, or in some embodiments all electrical components 106, is no longer being supplied by the battery 102.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle comprising:
 a battery configured to supply electricity to native and auxiliary electrical components on or within the vehicle; and
 an electronic control unit (ECU) coupled to the battery and configured to:
  receive a user input assigning a first priority rank to one or more of the electrical components and a second priority rank below the first priority rank to an additional one or more of the electrical components;
  stop the battery from supplying the electricity to electrical components associated with one or more respective priority ranks that are below the second priority rank when a remaining amount of charge of the battery is at or below a first battery charge threshold; and
  determine a charging station closest to the vehicle that can be reached by the vehicle based on:
   the remaining amount of charge of the battery,
   the battery maintaining the supply of the electricity to electrical components associated with one or more respective priority ranks that are the same as or higher than the first priority rank, and
   stopping the battery from supplying the electricity to electrical components associated with one or more respective priority ranks that are below the first priority rank when the remaining amount of charge of the battery reaches a second battery charge threshold.

2. The vehicle of claim 1, wherein the electrical components are grouped in priority groups, each priority group of the priority groups associated with a priority rank.

3. The vehicle of claim 1, wherein the user input further includes the first battery charge threshold.

4. The vehicle of claim 1, wherein the ECU is further configured to generate a notification to be communicated to a user of the vehicle when the remaining amount of charge of the battery is at or below the first battery charge threshold.

5. The vehicle of claim 1, further comprising a global positioning system (GPS) sensor coupled to the ECU and configured to detect location data corresponding to a location of the vehicle in real-time; and
   wherein the ECU is further configured to determine the charging station closest to the vehicle based on the location of the vehicle in real-time.

6. The vehicle of claim 1, wherein the native electrical components are integrated into the vehicle and the auxiliary electrical components are not integrated into the vehicle.

7. A vehicle comprising:
   a battery configured to supply electricity to native and auxiliary electrical components on or within the vehicle; and
   an electronic control unit (ECU) coupled to the battery and configured to:
      generate and display, via a user interface coupled to the ECU, a message to a user of the vehicle when a remaining amount of charge of the battery is low;
      receive, via the user interface, a user input including a user-specified threshold priority rank provided to determine a charging station closest to the vehicle that can be reached by the vehicle with the battery maintaining the supply of the electricity to one or more of the electrical components associated with one or more respective priority ranks that are the same as or higher than the user-specified threshold priority rank; and
      determine the charging station closest to the vehicle that can be reached by the vehicle based on:
         the remaining amount of charge of the battery,
         the battery maintaining the supply of the electricity to the one or more of the electrical components associated with one or more respective priority ranks that are the same as or higher than the user-specified threshold priority rank, and
         stopping the battery from supplying the electricity to another one or more of the electrical components associated with one or more respective priority ranks that are below the user-specified threshold priority rank when the remaining amount of charge of the battery becomes critical.

8. The vehicle of claim 7, wherein the ECU is further configured to receive one or more grouping instructions from the user to group the electrical components into one or more groups, each of the one or more groups including a subset of the electrical components for which the ECU controls the electricity supply from the battery simultaneously.

9. The vehicle of claim 7, wherein the remaining amount of charge of the battery is low when the remaining amount of charge is below a predetermined percentage.

10. The vehicle of claim 7, further comprising a motor configured to convert at least some of the electricity into mechanical energy to propel the vehicle; and
   wherein the remaining amount of charge of the battery is critical when the remaining amount of charge is insufficient for the motor to propel the vehicle to the charging station closest to the vehicle with the remaining amount of charge of the battery and with the battery maintaining the supply of the electricity to the another one or more of the electrical components associated with the one or more respective priority ranks that are below the user-specified threshold priority rank.

11. The vehicle of claim 10, further comprising a global positioning system (GPS) sensor coupled to the ECU and configured to detect location data corresponding to a location of the vehicle in real-time; and
   wherein the ECU is further configured to determine the charging station closest to the vehicle based on the location of the vehicle in real-time.

12. The vehicle of claim 7, wherein the native electrical components are integrated into the vehicle and the auxiliary electrical components are not integrated into the vehicle.

13. A vehicle comprising:
   a battery configured to supply electricity to native and auxiliary electrical components on or within the vehicle, the native electrical components being integrated into the vehicle and the auxiliary electrical components not being integrated into the vehicle; and
   an electronic control unit (ECU) coupled to the battery and configured to:
      assign a first priority rank to one or more of the native electrical components and a second priority rank that is below the first priority rank to one or more of the auxiliary electrical components;
      stop the battery from supplying the electricity to the auxiliary electrical components associated with the second priority rank and/or one or more respective priority ranks that are below the second priority rank when a remaining amount of charge of the battery is at or below a first battery charge threshold; and
      determine a charging station closest to the vehicle that can be reached by the vehicle based on:
         the remaining amount of charge of the battery,
         the battery maintaining the supply of the electricity to the native electrical components associated with the first priority rank and/or one or more respective priority ranks that are above the first priority rank, and
         stopping the battery from supplying the electricity to the native electrical components and/or the auxiliary electrical components associated with one or more respective priority ranks that are below the first priority rank when the remaining amount of charge of the battery reaches a second battery charge threshold.

14. The vehicle of claim 13, wherein the native and auxiliary electrical components are grouped in priority groups, each priority group of the priority groups associated with a priority rank.

15. The vehicle of claim 13, wherein the ECU is further configured to assign the first priority rank to one or more of the native electrical components and the second priority rank that is below the first priority rank to the one or more of the auxiliary electrical components based on user input, the user input including the first battery charge threshold.

16. The vehicle of claim 13, wherein the ECU is further configured to generate a notification to be communicated to a user of the vehicle when the remaining amount of charge of the battery is at or below the first battery charge threshold.

17. The vehicle of claim 13, further comprising a global positioning system (GPS) sensor coupled to the ECU and configured to detect location data corresponding to a location of the vehicle in real-time; and
   wherein the ECU is further configured to determine the charging station closest to the vehicle based on the location of the vehicle in real-time.

* * * * *